United States Patent
Sommer et al.

(10) Patent No.: US 7,826,568 B2
(45) Date of Patent: Nov. 2, 2010

(54) FAR-END CROSSTALK (FEXT) CANCELLER

(75) Inventors: Naftali Sommer, Rishon Letzion (IL); Itay Lusky, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 977 days.

(21) Appl. No.: 11/617,845

(22) Filed: Dec. 29, 2006

(65) Prior Publication Data

US 2008/0160915 A1 Jul. 3, 2008

(51) Int. Cl.
*H03D 1/04* (2006.01)
*H04J 1/12* (2006.01)
(52) U.S. Cl. ........................... 375/346; 370/201
(58) Field of Classification Search ......... 375/219–220, 375/222, 232–233, 257, 285, 346, 350; 370/286, 370/289–290, 201
See application file for complete search history.

(56) References Cited

U.S. PATENT DOCUMENTS

| | | | | |
|---|---|---|---|---|
| 5,181,198 A | * | 1/1993 | Lechleider | 370/286 |
| 6,553,085 B1 | * | 4/2003 | Trans | 375/346 |
| 7,042,934 B2 | * | 5/2006 | Zamir | 375/222 |
| 7,583,724 B2 | * | 9/2009 | Shirani | 375/219 |
| 2003/0086362 A1 | * | 5/2003 | Hasegawa et al. | 370/201 |
| 2004/0170230 A1 | * | 9/2004 | Zimmerman et al. | 375/285 |
| 2006/0114977 A1 | * | 6/2006 | Ginis et al. | 375/222 |

* cited by examiner

*Primary Examiner*—Khanh C Tran
(74) *Attorney, Agent, or Firm*—Steven A. Shaw; W. James Brady; Frederick J. Telecky, Jr.

(57) ABSTRACT

A novel and useful mechanism for the detection, estimation and correction of far-end cross talk (FEXT) caused by transmissions over adjacent wire pairs or cables. The detection, estimation and correction technique of the invention can be used to identify and compensate for FEXT impairments in Ethernet and DSL systems. The detection, estimation and correction is performed utilizing one of several techniques including linear forward filtering, backward decision feedback based filtering and a combination thereof. Results of simulations are presented illustrating the performance improvements provided by the present invention.

20 Claims, 11 Drawing Sheets

FAR-END CROSSTALK (FEXT) CANCELLER

FIELD OF THE INVENTION

The present invention relates to the field of data communications and more particularly relates to an apparatus for far-end crosstalk (FEXT) cancellation of transmissions from adjacent cable pairs.

BACKGROUND OF THE INVENTION

Modern network communication systems are generally of either the wired or wireless type. Wireless networks enable communications between two or more nodes using any number of different techniques. Wireless networks rely on different technologies to transport information from one place to another. Several examples include, for example, networks based on radio frequency (RF), infrared, optical, etc. Wired networks may be constructed using any of several existing technologies, including metallic twisted pair, coaxial, optical fiber, etc.

Communications in a wired network typically occurs between two communication transceivers over a length of cable making up the communications channel. Each communications transceiver comprises a transmitter and receiver components. The receiver component typically comprises one or more cancellers. Several examples of the type of cancellers typically implemented in Ethernet transceivers, especially gigabit Ethernet transceivers include, echo cancellers, near-end crosstalk (NEXT) cancellers, far-end crosstalk cancellers (FEXT), etc.

The deployment of faster and faster networks is increasing at an ever quickening pace. Currently, the world is experiencing a vast deployment of gigabit Ethernet (GE) devices. As the number of installed gigabit Ethernet nodes increases, the need for reliable communications has become more important than ever. One of the impairments commonly encountered in Ethernet networks, especially gigabit Ethernet networks, is FEXT noise.

It is desirable that the estimation and compensation of the FEXT impairment will be performed using residual noise measurements made during the regular operating mode of the system. The noise impairment can be calculated using a simple energy calculation. The disadvantage of such a measurement, however, is that the measured noise in actuality comprised of a combination of several noise sources, such as thermal noise, NEXT noise, FEXT noise and many others. As a result, isolation of the FEXT noise is not possible or at best is inaccurate.

A prior art approach to estimating the FEXT noise requires stopping the normal operation of the system and transmitting on adjacent interfering cables (i.e. wire pairs) only, and measuring the noise present on the cable or wire pair under test. A disadvantage of such a system is that the system must be stopped from its regular communication tasks. Further, monitoring and processing need to be performed, preferably by a well-trained technician. While this method achieves the goal of measuring the FEXT noise, the measurement procedure is complex and it interferes with the regular operation of the system. Moreover, stopping the normal operation of the system is not always possible.

Thus, there is a need for a mechanism for detecting, estimating and correcting for the FEXT impairment in a communications system such as a gigabit Ethernet or DSL system that can be incorporated into a conventional communications transceiver that is efficient and is relatively low cost in terms of hardware requirements.

SUMMARY OF THE INVENTION

The present invention is a novel and useful mechanism for the detection, estimation and compensation of far-end cross talk (FEXT) caused by signal transmissions over adjacent pairs of wires or cables. The FEXT detection, estimation and compensation technique of the invention can be used to identify and correct for FEXT impairments in numerous types of communication systems such as Ethernet and DSL systems. The FEXT detection, estimation and compensation scheme of the invention is performed utilizing an adaptive FEXT canceller filter wherein the canceller filter is used for cancellation purposes.

Further, the estimation mechanism can be active during normal operation of the system without affecting the performance of the communication system. All the FEXT filter tap coefficients can be estimated simultaneously, or alternatively estimation can be performed tap by tap, one at a time using a hardware mechanism that is shared amongst all the filter taps, as described in more detail in U.S. application Ser. No. 11/381,574, filed May 4, 2006, entitled "Apparatus For And Method Of Far-End Crosstalk (FEXT) Detection And Estimation", incorporated herein by reference in its entirety. Once adaptation is achieved, the filter coefficients can be used to correct for FEXT. In addition, spectral measurements of the FEXT impairment noise can be made based on the FEXT filter coefficients. The detection, estimation and correction is performed utilizing one of several techniques including linear forward equalization, backward decision feedback based equalization and a combination thereof.

Although the mechanism of the present invention can be used in numerous types of communication networks, to aid in illustrating the principles of the present invention, the FEXT detector, estimator and correction mechanism is described in the context of a FEXT detector/corrector incorporated in a gigabit Ethernet transceiver. It is appreciated that the invention is not limited to the example applications presented but can be applied to other communication systems as well without departing from the scope of the invention.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of cancellation of far-end crosstalk (FEXT) from one or more adjacent wire pairs, the method comprising the steps of performing feed forward equalization (FFE) on a signal received over a wire pair so as to generate a desired equalization signal therefrom, performing linear FEXT equalization on signals received from the adjacent wire pairs taken before feed forward equalization (FFE) in their respective receiver circuits so as to generate FEXT error signals therefrom and subtracting the FEXT error signals from the desired equalization signal to generate a FEXT compensated signal therefrom.

There is also provided in accordance with the present invention, a method of cancellation of far-end crosstalk (FEXT) from one or more adjacent wire pairs, the method comprising the steps of performing feed forward equalization (FFE) on a signal received over a wire pair so as to generate a desired equalization signal therefrom, delaying the desired equalization signal to generate a delayed desired equalization signal, performing linear FEXT equalization on signals received from the adjacent wire pairs taken after feed forward equalization (FFE) in their respective receiver circuits so as to generate FEXT error signals therefrom and subtracting the FEXT error signals from the delayed desired equalization signal to generate a FEXT compensated signal therefrom.

There is further provided in accordance with the present invention, an apparatus for cancellation of far-end crosstalk (FEXT) from one or more adjacent wire pairs comprising a feed forward equalizer operative to perform feed forward equalization (FFE) on a signal received over a wire pair so as to generate a desired equalization signal therefrom, a delay circuit operative to delay the desired equalization signal to generate a delayed desired equalization signal, a slicer adapted to generate decisions from signals received from the adjacent wire pairs taken after feed forward equalization (FFE), an auxiliary decision feedback equalizer (DFE) operative to generate a DFE error signal from the decisions output of the slicer, wherein the DFE error signal is subtracted from the input to the slicer, a linear FEXT equalizer for performing linear FEXT equalization on the slicer output so as to generate FEXT error signals therefrom and means for subtracting the FEXT error signals from the delayed desired equalization signal to generate a FEXT compensated signal therefrom.

There is also provided in accordance with the present invention, a method of cancellation of far-end crosstalk (FEXT) from one or more adjacent wire pairs, the method comprising the steps of performing feed forward equalization (FFE) on a signal received over a wire pair so as to generate a desired equalization signal therefrom, first performing FEXT equalization on signals received from the adjacent wire pairs taken before feed forward equalization (FFE) in their respective receiver circuits so as to generate first FEXT error signals therefrom and second performing FEXT equalization on adjacent wire pair zero delay decoder output decisions so as to generate second FEXT error signals therefrom and subtracting the first FEXT error signals and the second FEXT error signals from the delayed desired equalization signal to generate a FEXT compensated signal therefrom.

There is further provided in accordance with the present invention, a communications transceiver comprising a transmitter coupled to the communications channel, a receiver coupled to the communications channel, a far-end crosstalk (FEXT) canceller comprising means for performing feed forward equalization (FFE) on a signal received over a wire pair so as to generate a desired equalization signal therefrom, means for performing feedfoward based FEXT equalization on signals received from one or more adjacent wire pairs taken before feed forward equalization (FFE) in their respective receiver circuits so as to generate first FEXT error signals therefrom and means for performing decision feedback based FEXT equalization on adjacent wire pair zero delay Viterbi output decisions so as to generate second FEXT error signals therefrom and means for subtracting the first FEXT error signals and the second FEXT error signals from the delayed desired equalization signal to generate a FEXT compensated signal therefrom.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
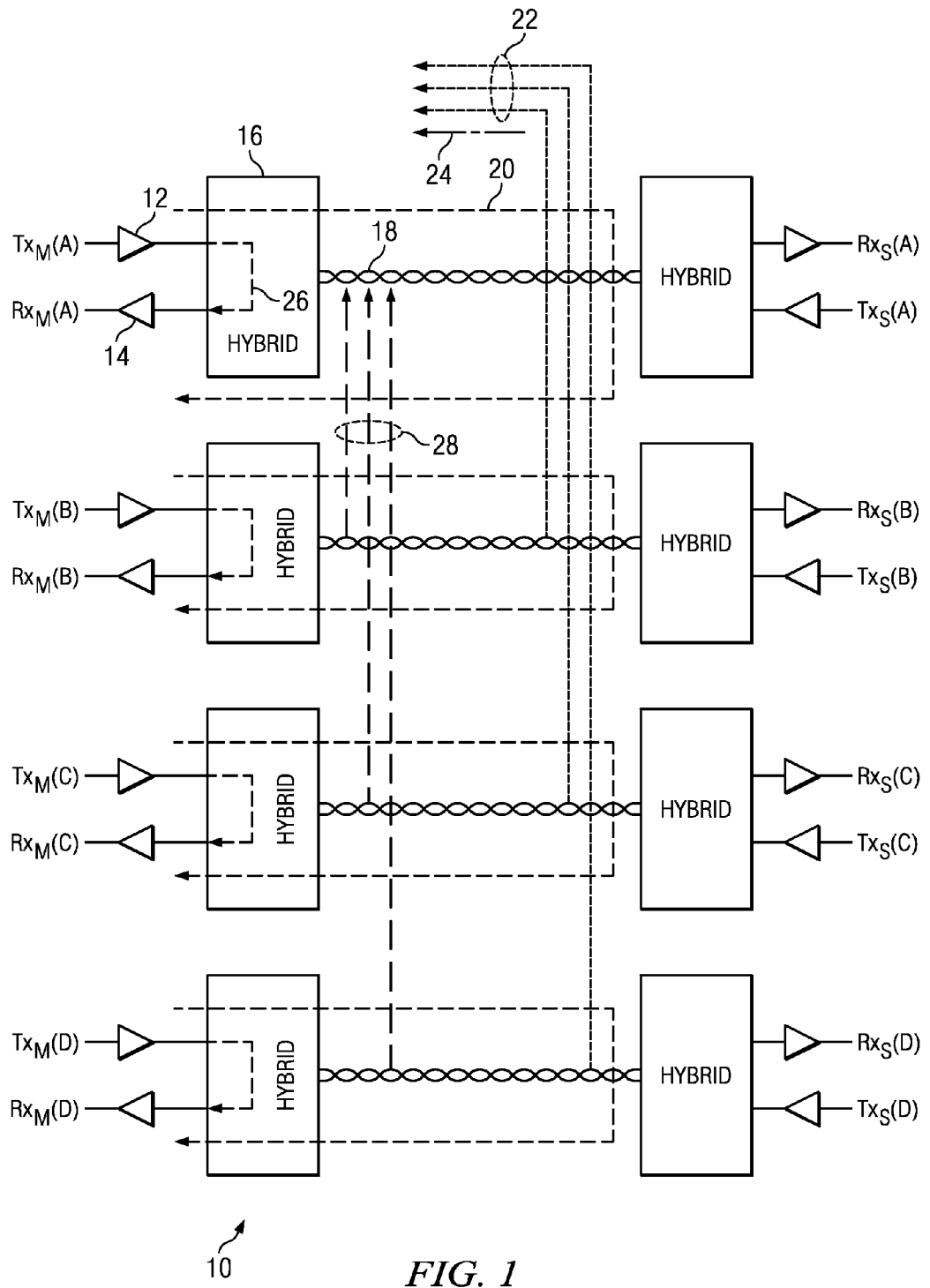
FIG. 1 is a block diagram illustrating the typical 1000Base-T noise environment.

The following notation is used throughout this document.

| Term | Definition |
|---|---|
| AFE | Analog Front End |
| AGC | Automatic Gain Control |
| ANEXT | Alien Near-End Crosstalk |
| ASIC | Application Specific Integrated Circuit |
| AWGN | Additive White Gaussian Noise |
| DFE | Decision Feedback Equalizer |
| DSL | Digital Subscriber Line |
| DSP | Digital Signal Processor |
| ELFEXT | Equal Level Far-End Crosstalk |
| FBE | Feedback Equalizer |
| FEC | Forward Error Correction |
| FEXT | Far-End Crosstalk |
| FFE | Feed Forward Equalizer |
| FIR | Finite Impulse Response |
| FPGA | Field Programmable Gate Array |
| GE | Gigabit Ethernet |
| HDL | Hardware Description Language |
| IC | Integrated Circuit |
| IEEE | Institute of Electrical and Electronics Engineers |
| ISI | Intersymbol Interference |
| LMS | Least Mean Square |
| LPF | Low Pass Filter |
| MDELFEXT | Multiple Disturber Equal Level Far-End Crosstalk |

-continued

| Term | Definition |
| --- | --- |
| NEXT | Near-End Crosstalk |
| PSELFEXT | Power Sum Equal Level Far-End Crosstalk |
| PSNEXT | Power Sum Near-End Crosstalk |
| RF | Radio Frequency |
| SNR | Signal to Noise Ratio |
| STP | Shielded Twisted Pair |
| UTP | Unshielded Twisted Pair |
| ZOH | Zero Order Hold |

DETAILED DESCRIPTION OF THE INVENTION

The present invention provides a useful and novel mechanism for the detection, estimation and compensation of FEXT impairment caused by signal transmission over adjacent wire pairs or cables. The detection, estimation and compensation technique of the invention can be used to identify and mitigate FEXT impairments in numerous types of communication systems such as gigabit Ethernet and DSL based systems. The detection, estimation and compensation scheme is performed utilizing an adaptive FEXT canceller filter that is used for canceling. In accordance with the invention, the FEXT detection, estimation and compensation mechanism is operative during normal operation of the system without requiring a cessation in transmission.

To aid in understanding the principles of the present invention, the description of the FEXT detection, estimation and compensation mechanism is provided in the context of a gigabit Ethernet transceiver circuit that can be realized in an integrated circuit (IC). The FEXT detection, estimation and compensation mechanism of the present invention has been incorporated in an Ethernet IC adapted to provide 10Base-T, 100Base-T and 1000Base-T communications over a metallic twisted pair channel. Although the invention is described in the context of a gigabit Ethernet PHY communications link, it is appreciated that one skilled in the art can apply the principles of the invention to other communication systems without departing from the scope of the invention.

It is appreciated by one skilled in the art that the FEXT detection, estimation and compensation mechanism of the present invention can be adapted for use with numerous other types of wired communications networks such as asynchronous or synchronous DSL channels, coaxial channels, etc. without departing from the scope of the invention.

Note that throughout this document, the term communications device is defined as any apparatus or mechanism adapted to transmit, receive or transmit and receive data through a medium. The term communications transceiver is defined as any apparatus or mechanism adapted to transmit and receive data through a medium. The communications device or communications transceiver may be adapted to communicate over any suitable medium, including wired media such as twisted pair cable or coaxial cable. The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The Ethernet PHY operating environment is typically exposed to diverse interference sources. A block diagram illustrating the typical 1000Base-T noise environment is shown in FIG. 1. The environment, generally referenced 10, comprises two transceivers Master (M) and Slave (S), each comprising a plurality of transmitters 12, receivers 14 and hybrid circuits 16. The transceivers are coupled by a plurality of twisted pair cables 18. A gigabit Ethernet communications link is characterized by full duplex transmission over Category 5 and higher cable that may be shielded (STP) or unshielded twisted pair (UTP) cable. The cable comprises four twisted metallic copper pairs wherein all four pairs are used for both transmission and reception. Note that for notation purposes, each one of the twisted pairs is referred to as a 'channel' and the combined four twisted pair bundle generating one gigabit Ethernet connection is referred to as a 'cable'.

In operation, each transceiver receives an input data stream from an external data source such as a host or other entity (not shown). The transceiver generates an output symbol stream from the input data stream and transmits the output symbol stream over the communications channel to the transceiver on the other side. The transceivers on either end of a channel are considered link partners. One is designated a master, the other a slave. A link partner can be either active or inactive. An inactive link partner is a transceiver that is not transmitting at the moment. An active link partner is a transceiver that is currently transmitting.

In the receive direction, each transceiver receives a receive signal from the communications channel. The receive signal may comprise an input symbol stream transmitted from the link partner. The transceiver generates an output from this input symbol stream. The receive signal may also comprise a signal representing energy from any number of interference sources, e.g., an echo signal representing the original transmitted signal that has been reflected back towards the transceiver. The transmitted signal may be reflected back due to a channel fault such as an open cable, shorted cable, unmatched load or any irregularities in impedance along the length of the cable. Such irregularities may be caused by broken, bad or loose connectors, damaged cables or other faults.

The Ethernet PHY environment is typically exposed to diverse interference sources. Several of these interference sources are illustrated in FIG. 1, and include: near-end echo 26, far-end echo 20, attenuation 24, near-end crosstalk 28 and far-end crosstalk 22. The main interference sources (i.e. Ethernet impairments or noise sources) an Ethernet transceiver is exposed to are described below. Note that these and other impairments may be applicable to other communication link PHY schemes and are not to be limited to gigabit Ethernet. The requirements of the impairments to be monitored are defined by the IEEE 802.3 1000Base-T specification. The requirements presented infra apply to a 100 meter cable at all frequencies from 1 MHz to 100 MHz.

Insertion loss/Attenuation: Insertion loss (denoted by line 24) is the intersymbol interference (ISI) introduced to the far side transmitted signal and is compensated by the equalizer in the receiver. The worst case insertion loss is defined by the IEEE 802.3 standard as:

$$\text{Insertion\_Loss}(f) < 2.1 f^{0.529} + 0.4 f_{dB} \tag{1}$$

where f denotes frequency. Insertion loss and ISI interference are usually mitigated using an adaptive equalizer. The equalizer may comprise a feed forward equalizer (FFE) or feedback equalizer (FBE).

Return loss (echo)/near-end echo rejection: The echo signal (denoted by line 26 in FIG. 1A) is the reflection of the transmitted signal onto the receiver path. The echo can be a near-end echo reflection due to the full duplex usage of each pair or a far-end reflection due to unmatched hardware connection components along the cable topology or at the far-side connector. The worst case far-end return loss is defined by the IEEE 802.3 standard as:

$$\text{Return\_Loss}(f) \begin{cases} 15 & (1-20\,\text{MHz}) \\ 15 - 10\log_{10}(f/20) & (20-100\,\text{MHz}) \end{cases}_{dB} \quad (2)$$

where f denotes frequency and where the requirements for CAT5E is modified from 15 dB to 17 dB (i.e. an increase of 2 dB). Note that a high level of near-end echo signal may indicate a printed circuit board fault. Note also that the near-end echo reflection level is implementation specific and may be compensated for by the hybrid analog block 16. An adaptive echo canceller is a well-known technique for canceling echo signals. The adaptive echo canceller may use the least mean square (LMS) method or its equivalent.

Near-end crosstalk (NEXT) and far-end crosstalk (FEXT): NEXT crosstalk (denoted by lines 28) and FEXT crosstalk (denoted by line 22) are undesired signals coupled between adjacent pairs. The NEXT is noise coupled from near-side adjacent transmitters (i.e. of the other three pairs). FEXT is noise coupled from far-side adjacent transmitters. An adaptive NEXT canceller utilizing the LMS or equivalent algorithm is typically used to cancel NEXT signals. Similarly, an adaptive FEXT canceller utilizing the LMS or equivalent algorithm is typically used to cancel FEXT signals.

The worst case NEXT coupling is defined by the IEEE 802.3 standard as:

$$\text{NEXT}(f) > 27.1 - 16.8 \log_{10}(f/100)_{dB} \quad (3)$$

where f denotes frequency. Note that the standard also defines the following properties:

1. Equal Level FEXT (ELFEXT) is defined as the noise coupled from far-side transmitters to a far-side link partner and can be formulated as $$\text{ELFEXT} = \text{FEXT} - \text{Insertion\_loss} \quad (4)$$

2. Multiple Disturber ELFEXT (MDELFEXT) is defined as the different ELFEXT coupled from each of the three adjacent link partners in accordance with the following masks:

$$MDELFEXT(f) = \begin{cases} 17 - 20\log_{10}(f/100) \\ 19.5 - 20\log_{10}(f/100) \\ 23 - 20\log_{10}(f/100) \end{cases}_{dB} \quad (5)$$

where f denotes frequency and where the sum of the three ELFEXT signals is defined as Power Sum ELFEXT (PSELFEXT) which is limited by:

$$\text{PSELFEXT}(f) > 14.4 - 20 \log_{10}(f/100)_{dB} \quad (6)$$

Figure 2:
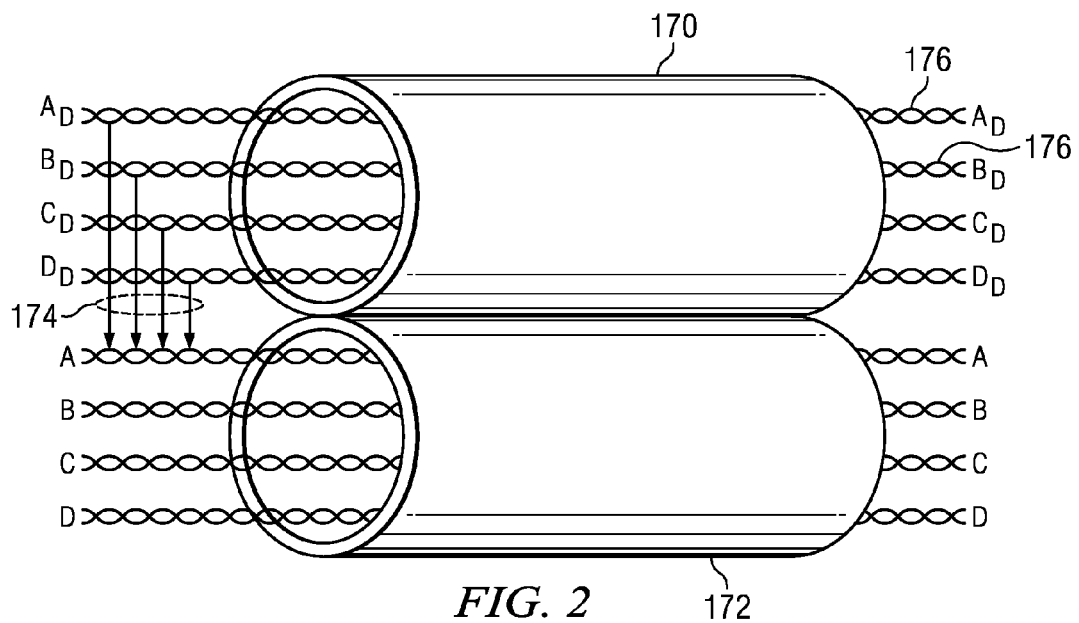
FIG. 2 is a diagram illustrating the alien NEXT (ANEXT) noise environment.

Alien NEXT (ANEXT): A diagram illustrating the alien NEXT (ANEXT) noise environment is shown in FIG. 2. The ANEXT noise (denoted by lines 174) is coupled to the modem receive path associated with the twisted pairs 176 in cable 172 from adjacent twisted pair links in cable 170. Unlike the NEXT noise signals, which are generated from a known transmitted sequence and therefore can be cancelled, the ANEXT noise signal is unknown and is thus much harder to cancel. The IEEE 802.3 standard defines the ANEXT as a 25 mV peak-to-peak signal generated by an attenuated 100Base-TX signal coupled to one of the receiver pairs.

Note that this model for the ANEXT may not be accurate since the ANEXT cannot be separated from the external coupled noise definition. It is assumed, however, that the external noise is composed of AWGN and the colored Alien NEXT. The standard does specify the PSNEXT loss as follows:

$$\text{PSNEXT\_loss}(f) < 35 - 15 \log_{10}(f/100)_{dB} \quad (7)$$

where f denotes frequency.

External noise: External noise is defined by the IEEE 802.3 standard as noise coupled from external sources and is bounded at 40 mV peak-to-peak (with 3 dB LPF at 100 MHz).

The echo, NEXT and sometimes the FEXT impairments are mitigated using dedicated cancellers. These cancellers typically consume significant hardware resources and a substantial amount of digital transceiver die area. In a typical gigabit Ethernet transceiver, for example, the integrated circuit (IC) area dedicated to the canceller may consume over 50% of the total digital portion of the IC. Thus, it is advantageous to reduce the power consumption of one or more cancellers used in the receiver.

The present invention is related to, but not necessarily limited to, general communication systems where transmissions occur over several communication links in parallel. An example of such a communication system is gigabit Ethernet where communication occurs over four twisted pair wires in parallel. Communication over such systems is performed using separate or partially separate transceivers for each of the links. Often, a portion of the functionality of each link is performed separately while other functions, such as the coding or decoding are performed jointly. Such communication systems usually suffer from three types of interferences: (1) interference from the transmitter of the same transmitter, i.e. echo, (2) interference from other transmitters on the same common transceiver (NEXT), and (3) interference from transmitters from the far-end side (FEXT) of the link.

Figure 3:
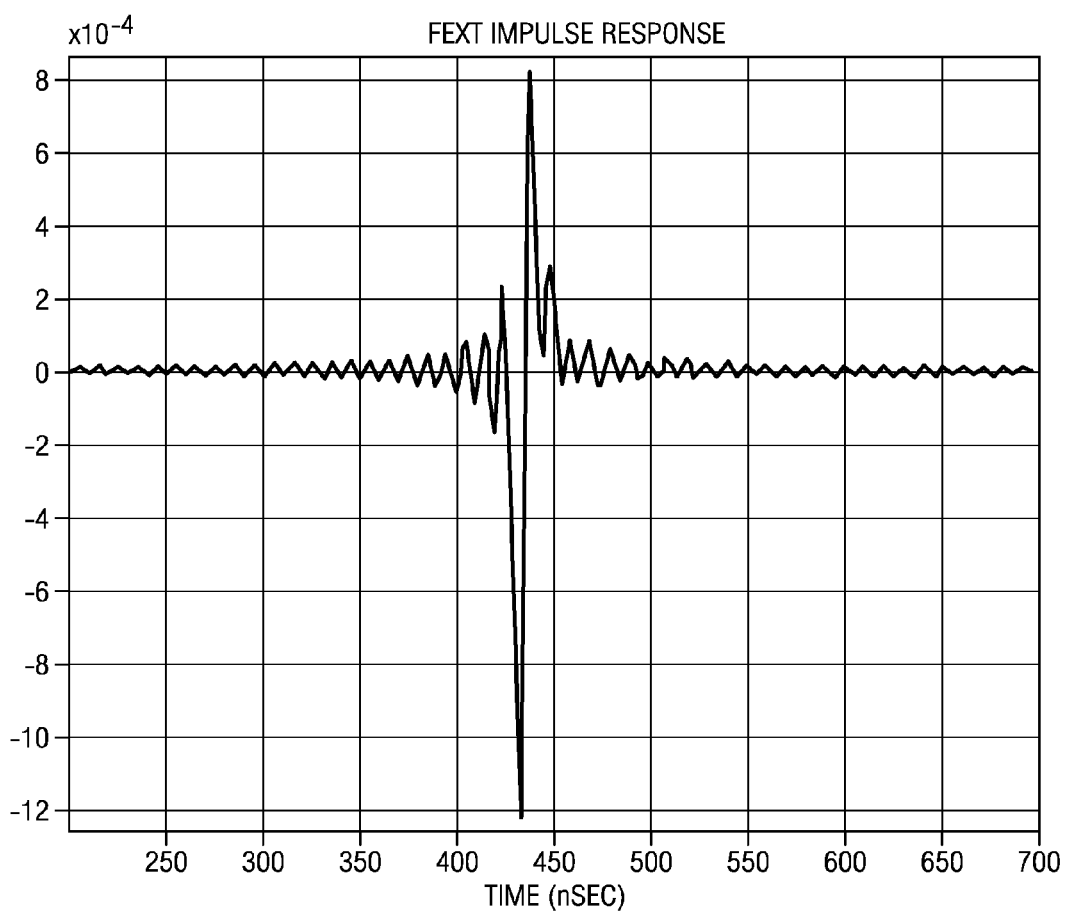
FIG. 3 is a graph illustrating the typical FEXT impulse response.

A graph of the impulse response of a typical FEXT path is shown in FIG. 3. Note that FEXT noise is typically the smallest of the three interferences and in many cases, it is not mitigated by the receiver at all. The invention provides a means of quantifying this noise for use in determining the link quality which, in turn, provides an indication of the communication rates supportable by the link. In addition, quantification of the FEXT noise permits identifying and fixing abnormal FEXT, which may be caused by a bad cable, wire pair or improper installation. The invention thus provides an efficient and robust mechanism for identifying, quantifying, analyzing and correcting the FEXT noise without disrupting regular operation of the transceiver or modem.

Figure 4:
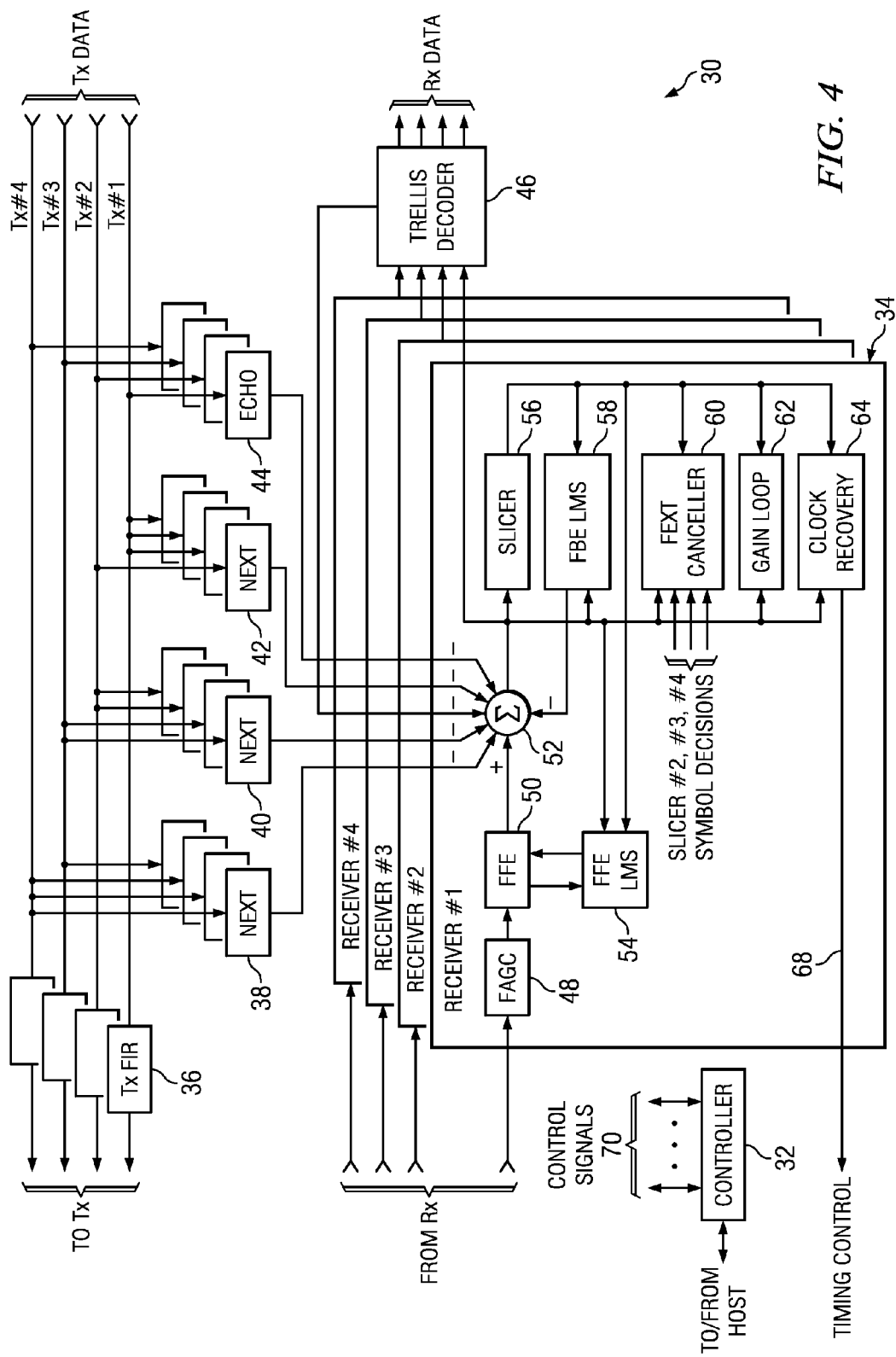
FIG. 4 is a block diagram illustrating an example communications transceiver incorporating the FEXT cancellation mechanism of the present invention.

A block diagram illustrating an example communications transceiver incorporating the FEXT detection and estimation mechanism of the present invention is shown in FIG. 4. The gigabit Ethernet transceiver, generally referenced 30, comprises TX FIR filter blocks 36 (one for each of four twisted pairs), four receiver blocks 34, controller 32, NEXT blocks 38, 40, 42, echo canceller 44 and Trellis decoder 46. Each of the receiver blocks 34 comprises fine automatic gain control (AGC) 48, feed forward equalizer (FFE) 50, least mean squares (LMS) block 54, adder 52, slicer 56, feedback equalizer (FBE) LMS 58, FEXT canceller block 60, gain loop 62 and clock recovery block 64.

In operation, receivers #1, #2, #3 and #4 receive the appropriate NEXT and echo canceller signals from the NEXT blocks 38, 40, 42 and echo canceller blocks 44, respectively. For each receiver, corresponding to a twisted pair, the NEXT is calculated from the TX signals for the other three pairs. For example, the NEXT for receiver #1 (i.e. pair #1), is calculated from signals TX #2, TX #3 and TX #4.

The clock recovery block generates the timing control signal 68. Controller 32 communicates with a host (not shown) and provides administration, configuration and control to the transceiver via plurality of control signals 70.

The FEXT canceller blocks 60 in each of the receiver modules implement the FEXT detection, estimation and correction mechanism of the present invention and are adapted to mitigate the effects of the FEXT impairment. A more detailed description of the FEXT canceller filter is provided infra.

As described supra, the present invention provides a mechanism for the detection, estimation and correction of FEXT noise. One approach to mitigating FEXT is to perform FEXT filtering. The description below assumes a single FEXT path between two receivers. Note, however, that the invention can be applied to any number of transceivers. FEXT cancellation can be performed using forward FEXT filtering or backward FEXT filtering. The difference being that forward FEXT filtering is linear whereby signal filtering occurs along the data path, before the slicer or Viterbi operations. Backward filtering is performed on decisions, e.g., decisions made by the slicer, the Viterbi algorithm or intermediate decisions of the Viterbi algorithm and is, therefore, nonlinear. Embodiments employing both techniques are described infra.

In an implementation of a forward FEXT canceller, no delay lines are inserted along the data path, so that a forward FEXT canceller is used for cancellation of "non-causal" FEXT coefficients. On the other end, implementation of a backward FEXT canceller is used for cancellation of "causal" FEXT coefficients, which is also implemented without a delay line along the data path, but with a delay line for slicer decisions.

Figure 5:
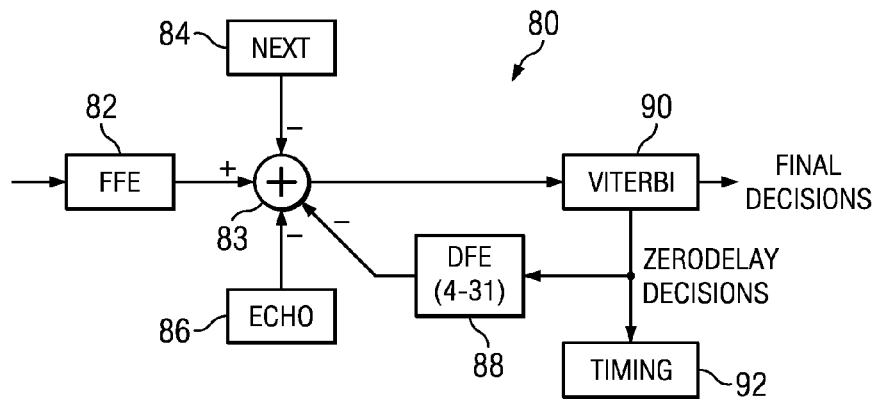
FIG. 5 is a simplified block diagram illustrating the receiver portion of an example Gigabit Ethernet transceiver.

A simplified block diagram illustrating the receiver portion of an example Gigabit Ethernet transceiver is shown in FIG. 5. The circuit, generally referenced 80, shows the configuration of the feed forward equalizer (FFE) 82, NEXT canceller 84, echo canceller 86, Viterbi decoder 90, decision feedback equalizer (DFE) block 88 and timing block 72. The Viterbi decoder is operative to generate final output decisions. The DFE block operates on the zero delay Viterbi output decisions. The NEXT and echo correction signals are subtracted from the output of the FFE via adder 83.

Note that in the embodiment presented herein, the first three taps are implemented in the Viterbi decoder to provide an efficient means of enumeration over all code sequences. The Viterbi decoder is operative to mitigate error propagation by only permitting certain code sequences as valid sequences.

The FEXT impairment can be modeled mathematically as a set of equations as shown below. The equations correspond to the impairment model shown in FIG. 1, particularly the FEXT impairment (dotted lines 22) between two gigabit Ethernet transceivers.

$$\begin{bmatrix} y_1(z) \\ y_2(z) \\ y_3(z) \\ y_4(z) \end{bmatrix} = \begin{bmatrix} F_{11}(z) & F_{12}(z) & F_{13}(z) & F_{14}(z) \\ F_{21}(z) & F_{22}(z) & F_{23}(z) & F_{24}(z) \\ F_{31}(z) & F_{32}(z) & F_{33}(z) & F_{34}(z) \\ F_{41}(z) & F_{42}(z) & F_{43}(z) & F_{44}(z) \end{bmatrix} \cdot \begin{bmatrix} x_1(z) \\ x_2(z) \\ x_3(z) \\ x_4(z) \end{bmatrix} \quad (8)$$

$$= \begin{bmatrix} H_1(z) & \varepsilon \cdot R_{12}(z) & \varepsilon \cdot R_{13}(z) & \varepsilon \cdot R_{14}(z) \\ \varepsilon \cdot R_{21}(z) & H_2(z) & \varepsilon \cdot R_{23}(z) & \varepsilon \cdot R_{24}(z) \\ \varepsilon \cdot R_{31}(z) & \varepsilon \cdot R_{32}(z) & H_3(z) & \varepsilon \cdot R_{33}(z) \\ \varepsilon \cdot R_{41}(z) & \varepsilon \cdot R_{42}(z) & \varepsilon \cdot R_{43}(z) & H_4(z) \end{bmatrix} \cdot \begin{bmatrix} x_1(z) \\ x_2(z) \\ x_3(z) \\ x_4(z) \end{bmatrix}$$

where $y_c(z)$ denotes the received signal for channel 'c';

$F_{a,b}(z)$ denotes the frequency transform in the z domain between receive channel 'a' and transmit channel 'b';

$H_c(z)$ denotes the transfer function of the channel of interest (transmitter to receiver);

$x_c(z)$ denotes the transmit signal output from the other end of the connection for channel 'c';

$\varepsilon$ is a factor $\ll 1$;

Note that simultaneous FEXT and ISI cancellation is equivalent to 4-dimensional equalization and that multidimensional equalization is similar to 1-dimensional equalization. Note also that these equations can be adapted using the well known Least Mean Squares (LMS) algorithm. The proposed FEXT canceller architectures are inspired by three 1-dimensional equalization architectures: (1) linear equalizer (forward filter only), (2) combined forward filter and backward filter (i.e. DFE) equalization, and (3) backward filter only (which is not feasible due to delay or latency constraints).

Figure 6:
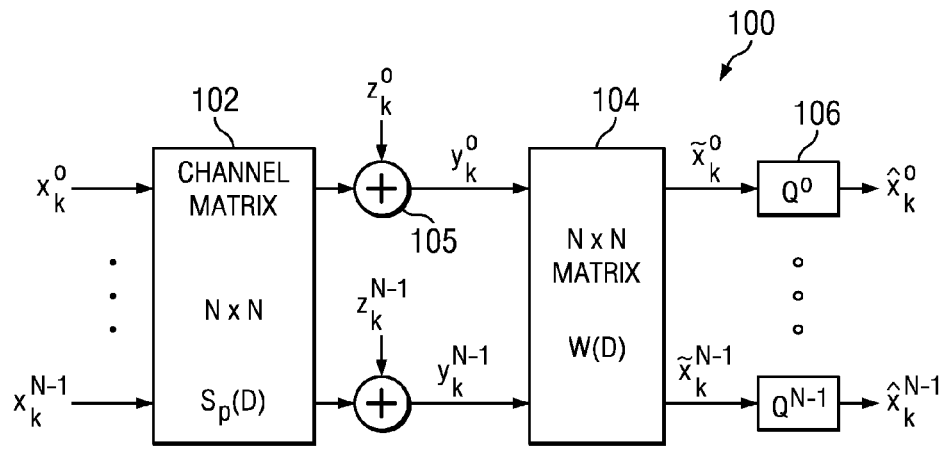
FIG. 6 is a block diagram illustrating an example implantation of a linear equalizer adapted for use with the FEXT canceller of the present invention.

A block diagram illustrating an example implantation of a linear equalizer adapted for use with the FEXT canceller of the present invention is shown in FIG. 6. The equalizer, generally referenced 100, comprises N×N channel matrix Sp(D) 102, adders 105, N×N matrix W(D) 104 which functions as a filter and a plurality of N quantizers 106 ($Q^0$ through $Q^{N-1}$).

The channel matrix generates an output signal in response to the N input signals ($x_k^0$ to $x_k^{N-1}$. The N noise signals (other than FEXT noise) $z_k^0$ to $z_k^{N-1}$ are added to each of the corresponding signals output of the channel matrix via adders 105 to generate signals $y_k^0$ to $y_k^{N-1}$ which are input to the filter 104. The filter is operative to generate signals $\tilde{x}_k^0$ to $\tilde{x}_k^{N-1}$ which are quantized via quantizers 106 to generate the output signals $\hat{x}_k^0$ to $\hat{x}_k^{N-1}$. Note that the filter coefficients are adapted using the well known LMS algorithm. An example of such LMS adaptation is shown in Equation 9 below. Note also that in the case of gigabit Ethernet, N equals four, representing the four channels.

Figure 7:
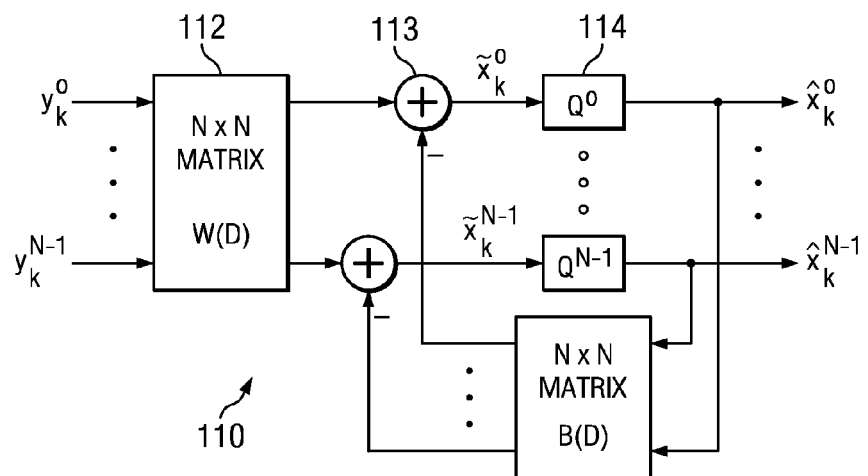
FIG. 7 is a block diagram illustrating an example implantation of a decision feedback equalizer adapted for use with the FEXT canceller of the present invention.

A block diagram illustrating an example implantation of a decision feedback equalizer concept adapted for use with the FEXT canceller of the present invention is shown in FIG. 7. The circuit, generally referenced 110, comprises a forward filter 112 implemented as an N×N matrix W(D), adders 113, quantizers 114 and feedback filter 118 implemented as an N×N matrix B(D).

In operation, the forward filter 112 is adapted to cancel the non-causal FEXT interference while the feedback filter 118 is adapted to cancel the causal FEXT interference. The coefficients of the filter matrices for the forward and feedback filters are adapted using the LMS algorithm. An example of such an LMS adaptation is shown in Equation 9 below. The feed forward filter generates an output signal from the received signal $y_k^0$ to $y_k^{N-1}$. The output of the DFE based FEXT canceller $\hat{x}_k^0$ to $\hat{x}_k^{N-1}$ is input to the feedback filter 118 whose output is subtracted from the output of the forward filter via adders 113. The summed output is quantized via quantizers 114 before being output of the circuit.

Figure 8:
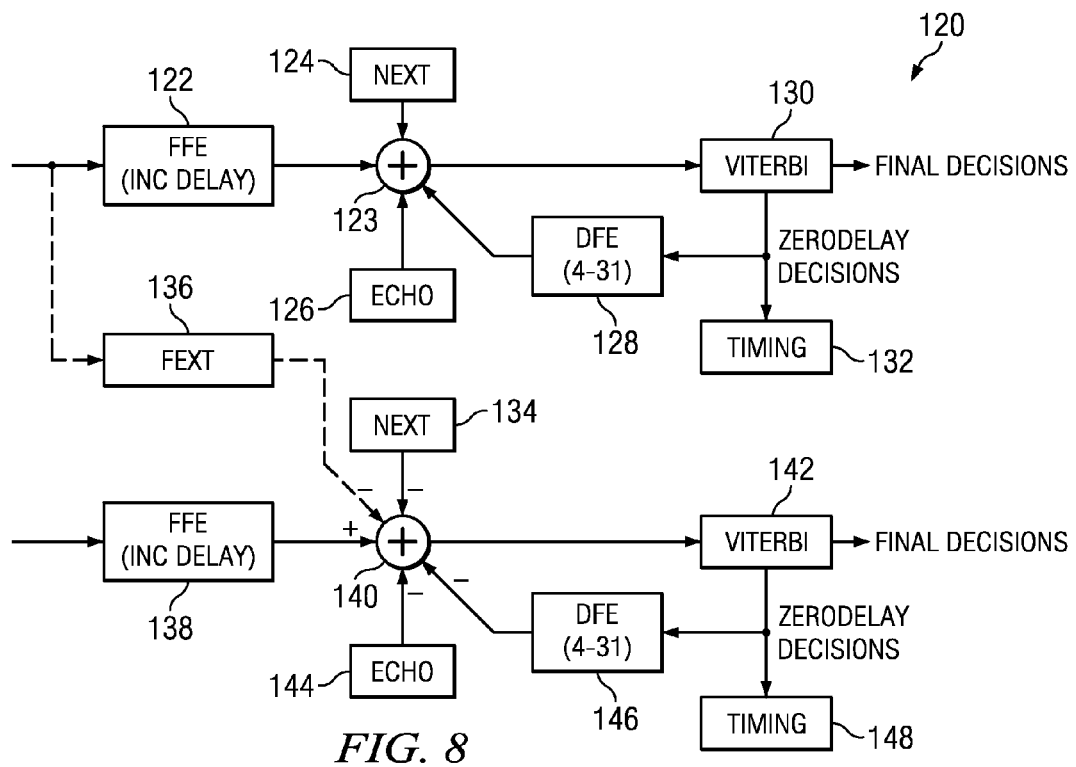
FIG. 8 is a block diagram illustrating a first embodiment of the FEXT canceller of the present invention employing linear equalization.

A block diagram illustrating a first embodiment of the FEXT canceller of the present invention employing linear equalization is shown in FIG. 8. In this embodiment the circuit, generally referenced 120, implements linear equalization. Two channels are shown including the channel of interest and one of the other three channels that generate FEXT interference. The same principles apply to the remaining two channels and are not shown for clarity sake. The channel of interest is shown as the lower path and comprises FFE 138, FEXT interference detection and estimation block 136, NEXT canceller 134, echo canceller 144, adder 140, Viterbi decoder 142, DFE 146 and timing block 148. The FEXT interference generating channel is shown as the upper path and comprises FFE 122, NEXT canceller 124, echo canceller 126, adder 123, Viterbi decoder 130, DFE 128 and timing block 132.

In operation, the linear FEXT cancellation block estimates the level of the FEXT interference using linear equalization techniques described above in FIG. 6. FEXT compensation is achieved by subtracting the estimated FEXT levels output of the FEXT block 136 (dashed lines) from the output of the FFE via adder 140. The FEXT block operates on the received signal taken before the FFE 122 of the impairment channel. The FFE blocks 122, 138 incorporate a delay to compensate for the FEXT canceller delay. The NEXT and echo impairment calculations and output of the DFE are also subtracted from the output of the FFE 138. Note that an advantage of this first embodiment is that the FEXT canceller comprises an inherent delay from the causal response of the filter implemented therein. This delay should be compensated for in the data path of the desired channel. The FEXT canceller delay, however, is compensated (at least partially) by the FFE delay, which results in a significant decrease in total delay. A disadvantage is that the input to the FEXT canceller is noisy (e.g., the echo from the other channels become NEXT for the channel of interest).

Figure 9:
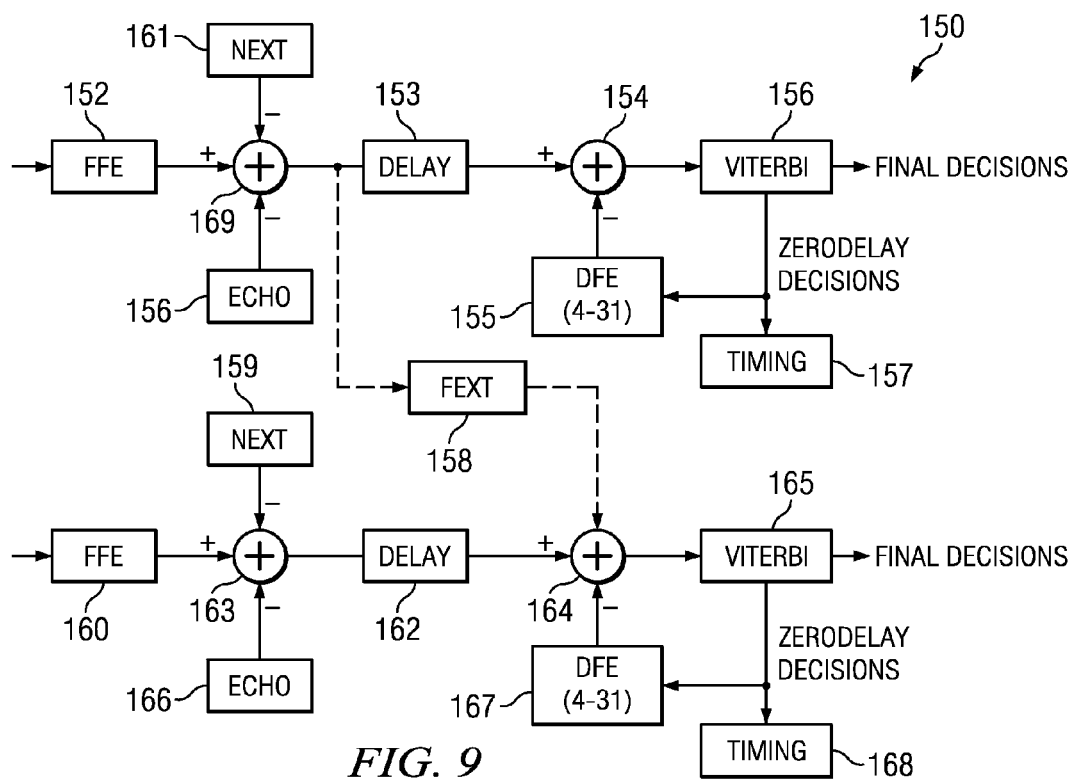
FIG. 9 is a block diagram illustrating a second embodiment of the FEXT canceller of the present invention employing linear equalization.

A block diagram illustrating a second embodiment of the FEXT canceller of the present invention employing linear equalization is shown in FIG. 9. In this embodiment, the circuit, generally referenced 150, implements linear equalization as well. Two channels are shown including the channel of interest and one of the other three channels that generate FEXT interference. The same principles apply to the remaining two channels and are not shown for clarity sake. The channel of interest is shown as the lower path and comprises FFE 160, FEXT interference detection and estimation block 158, NEXT canceller 159, echo canceller 166, adders 163, 164, delay block 162, Viterbi decoder 165, DFE 167 and timing block 168. The FEXT interference generating channel is shown as the upper path and comprises FFE 152, NEXT canceller 161, echo canceller 156, adders 169, 154, delay block 153, Viterbi decoder 130, DFE 155 and timing block 157.

In operation, the linear FEXT cancellation block estimates the level of the FEXT interface using linear equalization techniques described above in FIG. 6. FEXT compensation is achieved by subtracting the estimated FEXT levels output of the FEXT block 158 (dashed lines) from the output of the delay block 162 via adder 164. The FEXT block operates on the received signal taken after the FFE 152 of the impairment channel (i.e. the output of the adder 169). The NEXT and echo impairment calculations are also subtracted from the output of the FFE 160. Note that an advantage of this second embodiment is that the input to the FEXT canceller block is far less noisy than in the circuit of FIG. 8. Further, the FEXT canceller response requirements are less strict since the inputs are taken after the FFE and not before them (but still before the DFE). Thus, fewer taps are required (i.e. less complex) for the FEXT filter since the FFE block of the other channel already compensates for a portion of the channel.

The delay blocks 153, 162 are needed now since the FEXT canceller input is taken after the FFE, so a delay is needed to compensate for the inherent delay of the FEXT canceller. This avoids causality problems in the output of the canceller.

Figure 10:
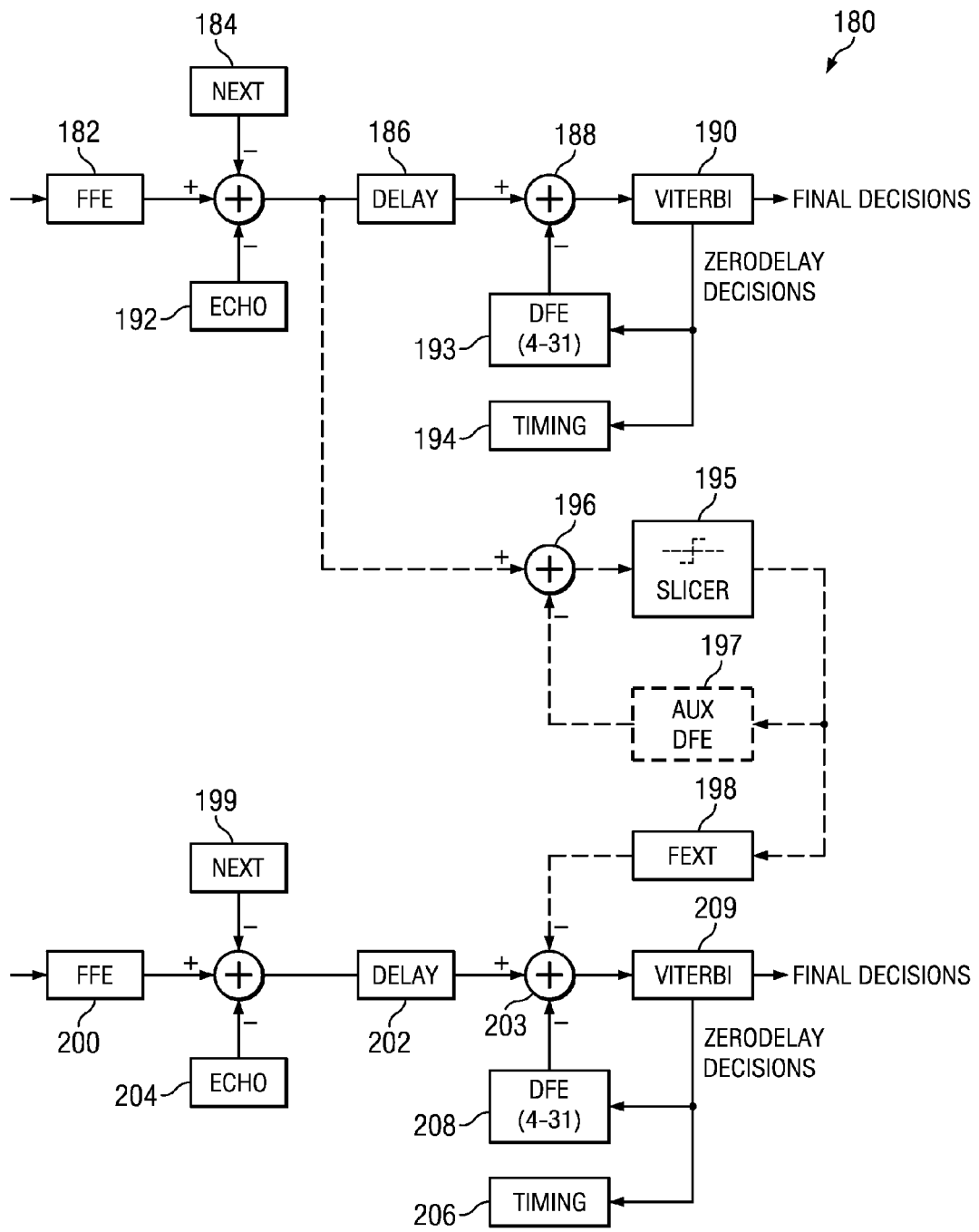
FIG. 10 is a block diagram illustrating a third embodiment of the FEXT canceller of the present invention employing a backward architecture.

A block diagram illustrating a third embodiment of the FEXT canceller of the present invention employing a backward architecture is shown in FIG. 10. In this embodiment, the circuit, generally referenced 180, implements backwards FEXT cancellation. Two channels are shown including the channel of interest and one of the other three channels that generate FEXT interference. The same principles apply to the remaining two channels and are not shown for clarity sake. The channel of interest is shown as the lower path and comprises FFE 200, adder 196, slicer 195, auxiliary DFE 197, FEXT interference detection and estimation block 198, NEXT canceller 199, echo canceller 204, adders 201, 203, delay block 202, Viterbi decoder 209, DFE (for taps 4-31) 208 and timing block 206. The FEXT interference generating channel is shown as the upper path and comprises FFE 182, NEXT canceller 184, echo canceller 192, adders 183, 188, delay block 186, Viterbi decoder 190, DFE (for taps 4-31) 193 and timing block 194.

In operation, the backward FEXT cancellation block estimates the level of the FEXT interface using DFE equalization techniques described above in FIG. 7. FEXT compensation is achieved by subtracting the estimated FEXT correction output of the FEXT block 198 (dashed lines) from the output of the delay block 302 via adder 203.

The NEXT and echo impairment calculations of the interference channel are subtracted from the output of the FFE 182. The FEXT block operates on the received signal taken after the FFE 182 and adder 183 of the impairment channel. An auxiliary DFE and slicer are needed since the decisions from the Viterbi decoder (even zero delay decisions) cannot be used, due to the inherent delay of the canceller. Therefore, the auxiliary DFE and slicer generate intermediate decisions, that can be used for cancellation since the desired signal is delayed appropriately. Note that the auxiliary DFE 197 only operates on the first three taps. The FEXT error compensation occurs after the delay block and is subtracted from the output therefrom via adder 203.

Note also that an advantage of this third embodiment is that the FEXT canceller only operates on decision input. Note further that the output of the Viterbi decoder cannot be used because of the delay inherent in the final decisions. Thus, the input to the FEXT canceller does not experience any noise sources other than slicer errors. This embodiment is less costly to implement as the filter has symbols at its input (and not multi-bit samples) and because the FEXT canceller response is less complex.

The delay blocks 186, 302 are needed since the FEXT canceller input is taken after the adders but before the delays and the FEXT canceller output is subtracted after the delay. This avoids causality problems in the output of the canceller.

Figure 11:
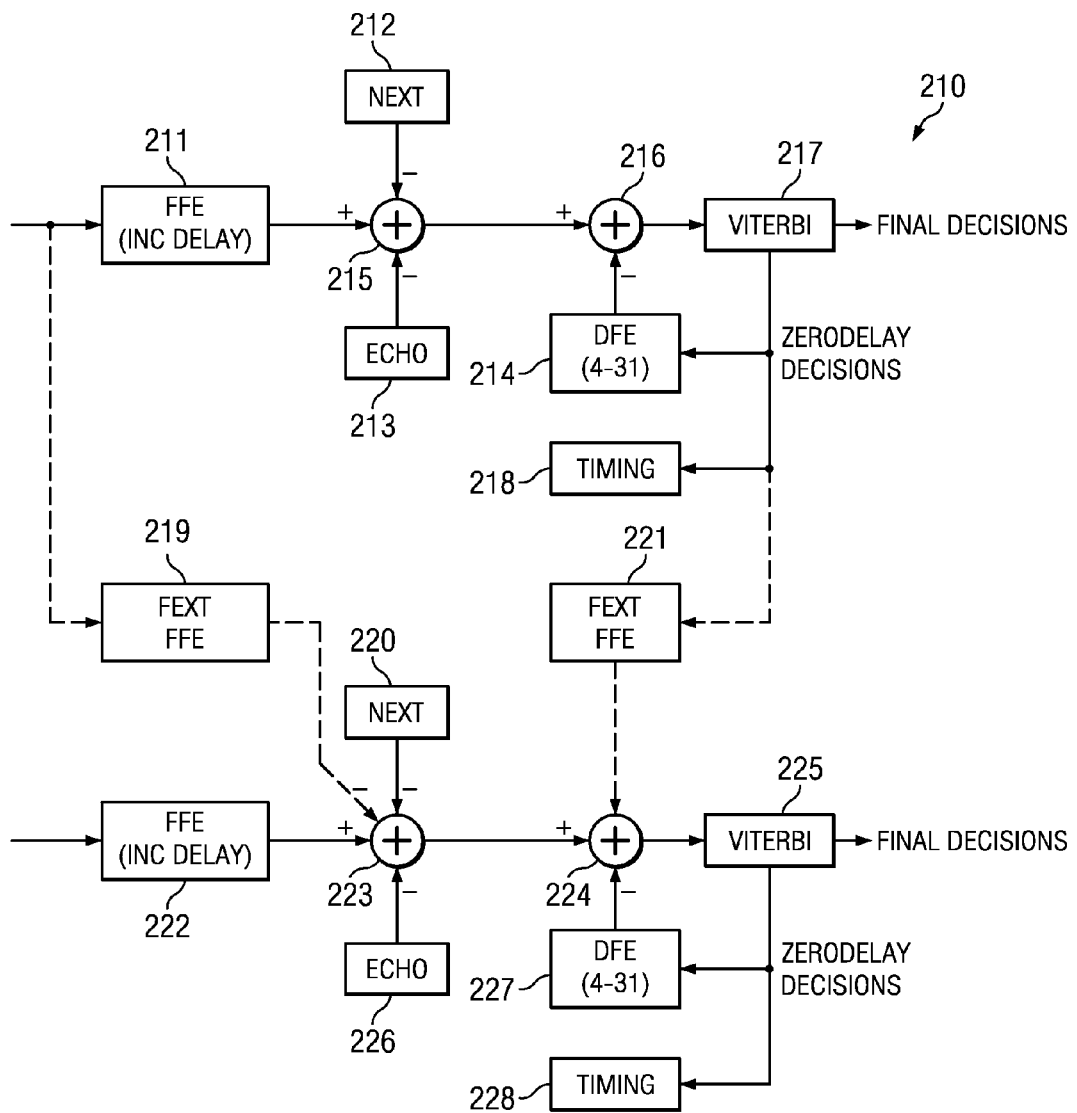
FIG. 11 is a block diagram illustrating a fourth embodiment of the FEXT canceller of the present invention employing decision feedback equalization.

A block diagram illustrating a fourth embodiment of the FEXT canceller of the present invention inspired by decision feedback equalization is shown in FIG. 11. In this embodiment, the circuit, generally referenced 210, implements both feed forward linear feedback and decision feedback based cancellation. Two channels are shown including the channel of interest and one of the other three channels that generate FEXT interference. The same principles apply to the remaining two channels and are not shown for clarity sake. The channel of interest is shown as the lower path and comprises feed forward equalization (FFE) (with inherent delay) 222, FFE based FEXT interference detection and estimation block 219, DFE based FEXT interference detection and estimation block 221, NEXT canceller 220, echo canceller 226, adders 223, 224, Viterbi decoder 225, DFE 227 and timing block 228. The FEXT interference generating channel is shown as the upper path and comprises FFE (with inherent delay) 211, NEXT canceller 212, echo canceller 213, adders 215, 216, Viterbi decoder 217, DFE 214 and timing block 218.

In operation, the FFE based FEXT cancellation block 219 estimates a first FEXT error correction signal using linear equalization techniques described above in FIG. 6. The input to the FFE based FEXT canceller 219 is taken before FFE 211 of the impairment channel. The first FEXT error correction signal is subtracted from the output of the FFE 222 via adder 223. The DFE based FEXT cancellation block 221 estimates a second FEXT error correction signal using decision feedback equalization techniques described above in FIG. 7. The input to the DFE based FEXT canceller 221 comprises the zero delay decisions output of the Viterbi decoder 217 of the impairment channel. The second FEXT error correction signal is subtracted from the output of adder 223 before it is input to the Viterbi decoder 225.

Note that an advantage of this fourth embodiment is the use of both FFE and DFE based FEXT cancellation techniques.

Figure 12:
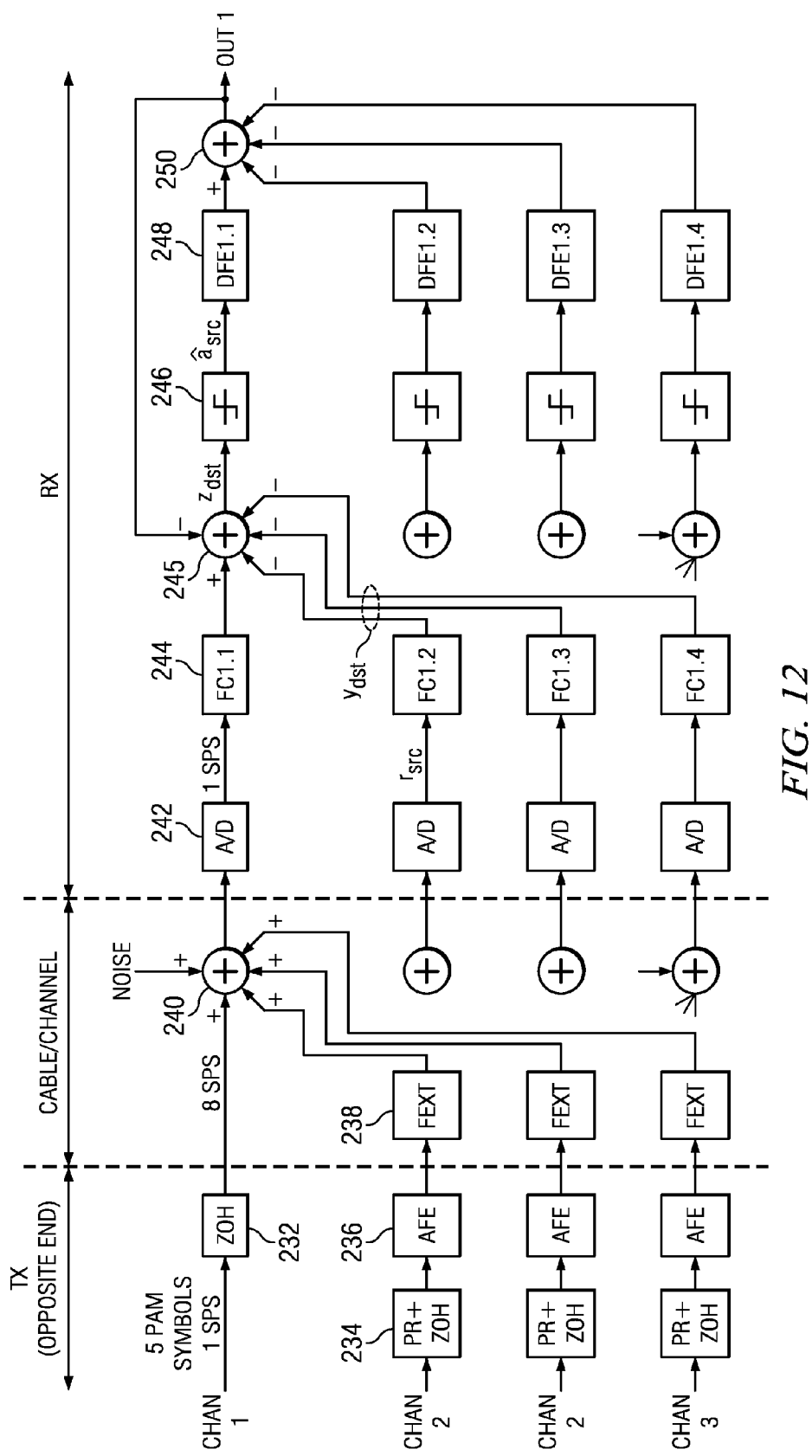
FIG. 12 is a block diagram illustrating the simulation setup used to simulate the FEXT canceller of the present invention.

The embodiments of the present invention have been simulated and a portion of the results are presented infra. A block diagram illustrating the simulation setup used to simulate the FEXT canceller of the fourth embodiment is shown in FIG. 12. The simulation circuit, generally referenced 230, is configured for gigabit Ethernet and simulates the FEXT impairments normally encountered in a real GE environment. The particular, the circuit 230 comprises a zero order hold (ZOH) 232, partial response and ZOH 234, analog front end (AFE) 236, FEXT interference generator (FEXT impairment generation) 238, adders 240, analog to digital converters (A/D) 242, forward FEXT canceller (FC blocks) 244, adders 245, slicers 246, backward FEXT cancellers (DFE blocks) 248 and adders 250.

In operation, the TX signal is generated by the four transmitters located at the opposite end of the channel (i.e. cable) and identified as channels #1 through #4. Channel #1 is the channel of interest and channels #2 through #4 generate FEXT interference. The FEXT impairments output of blocks 238 are combined with the signal of interest and noise other than FEXT noise via adder 240. The FEXT blocks 238 and adders 240 represent the channel (i.e. the cable). Note that an ideal channel without partial response is simulated for the channel of interest, since the target of this simulation setup is to focus on the FEXT impairment.

At the RX end, the received signal is converted to digital via the A/D converters 242 and applied to the forward FEXT cancellers 244 (FC1,1; FC1,2; FC1,3 and FC 1,4). The FEXT cancellers 244 perform the forward portion of the FEXT cancellation (i.e. the non causal part). The FEXT error signals generated by FC1,2; FC1,3 and FC 1,4 are subtracted from the signal output of FC1,1 via adder 245. The signal output of each corresponding channel path is then input to a slicer 246 associated therewith. The output of each slicer is input to a respective backward FEXT canceller (DFE1,1; DFE1,2; DFE1,3 and DFE1,4), each associated with a different channel. The FEXT error signal generated by each DFE (DFE1,2; DFE1,3 and DFE1,4) are subtracted from the output of DFE1,1 via adder 250. The output of the adder 250 constitutes the output for channel #1. Note that only a single channel of interest is shown in FIG. 12, but the simulation is operative to simulate all four channels simultaneously.

The equations describing the operation of the simulation circuit of FIG. 12, including both the cancellation and the LMS adaptation of the FEXT cancellers, are presented below.

$$y_{dist}^{(t)} = \sum_{src} \sum_{k=0}^{ffe\_len-1} FFE_{src,dst}^{(t)}[k] \cdot r_{src}^{(t-k)} \quad (9)$$

Figure 13:
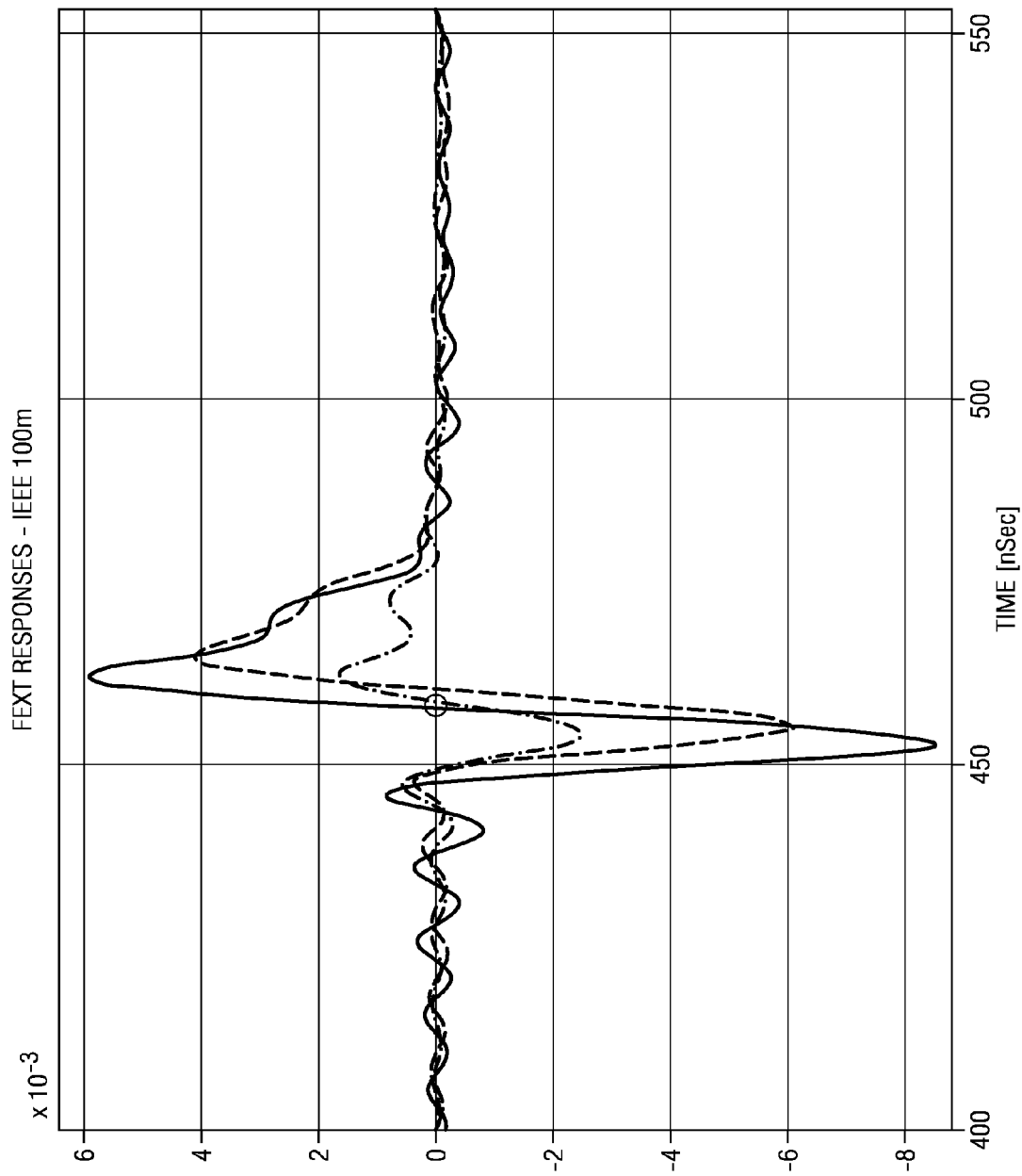
FIG. 13 is a graph illustrating the simulated FEXT response of the FEXT canceller of the present invention.

-continued $$FFE_{src,dst}^{(t+1)}[k] = FFE_{src,dst}^{(t)}[k] - \mu \cdot e_{dst}^{(t)} \cdot r_{src}^{(t-k)}$$

$$z_{dst}^{(t)} = y_{dst}^{(t)} + \sum_{src} \sum_{m=1}^{dfe\_len} DFE_{src,dst}^{(t)}[m] \cdot \hat{a}_{src}^{(t-m)}$$

$$DFE_{src,dst}^{(t+1)}[m] = DFE_{src,dst}^{(t)}[m] - \mu \cdot e_{dst}^{(t)} \cdot \hat{a}_{src}^{(t-m)}$$

where $z_{dst}$ denotes the filter output;

$FFE_{src,dst}$ denotes the forward FEXT canceller tap coefficients ($FC_{src,dst}$);

$r_{src}$ denotes the source samples;

ffe_len denotes the number of forward taps (e.g., four in this example);

k is the forward tap index;

$y_{dst}$ denotes the results of the forward FEXT cancellers;

$DFE_{src,dst}$ denotes the backward FEXT canceller tap coefficients ($DFE_{src,dst}$);

dfe_len denotes the number of backward taps (e.g., four in this example);

m is the backward tap index;

μ is the LMS adaptation step size;

$e_{dst}$ denotes the error ($\hat{a}_{src}$-$z_{dst}$);

A graph illustrating the simulated FEXT response of the FEXT canceller of the present invention is shown in FIG. 13. The response shown in the Figure is based on the IEEE 100 m test specification.

Figure 14:
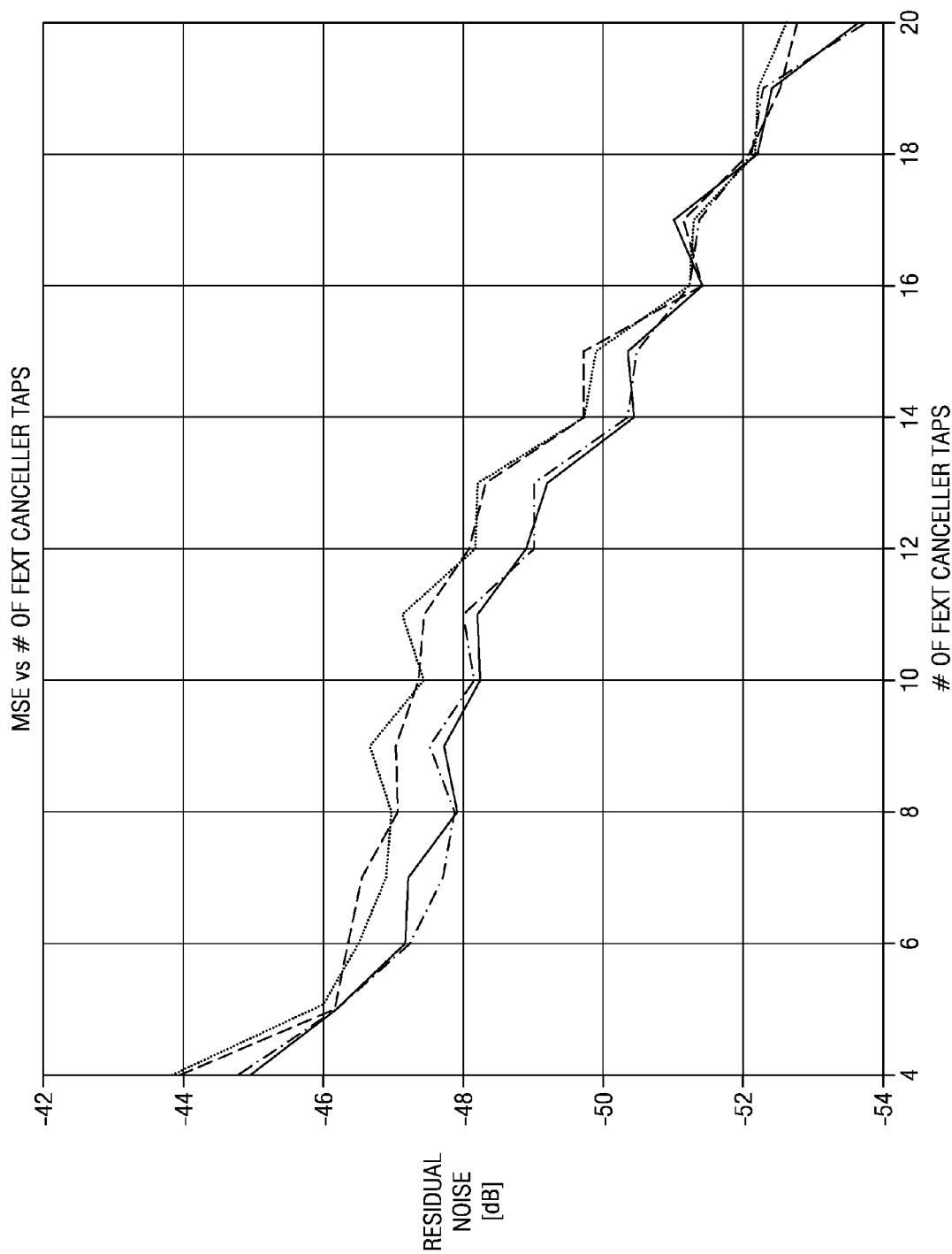
FIG. 14 is a graph illustrating the residual noise versus the number of FEXT canceller taps.

A graph illustrating the residual noise versus the number of FEXT canceller taps is shown in FIG. 14. As indicated in the Figure, as the number of FEXT canceller taps increases, the residual noise level at the output of the receiver drops. For example, doubling the number of FEXT canceller taps from 8 to 16 results in a reduction of approximately 4 dB in residual noise at the output of the receiver.

Figure 15:
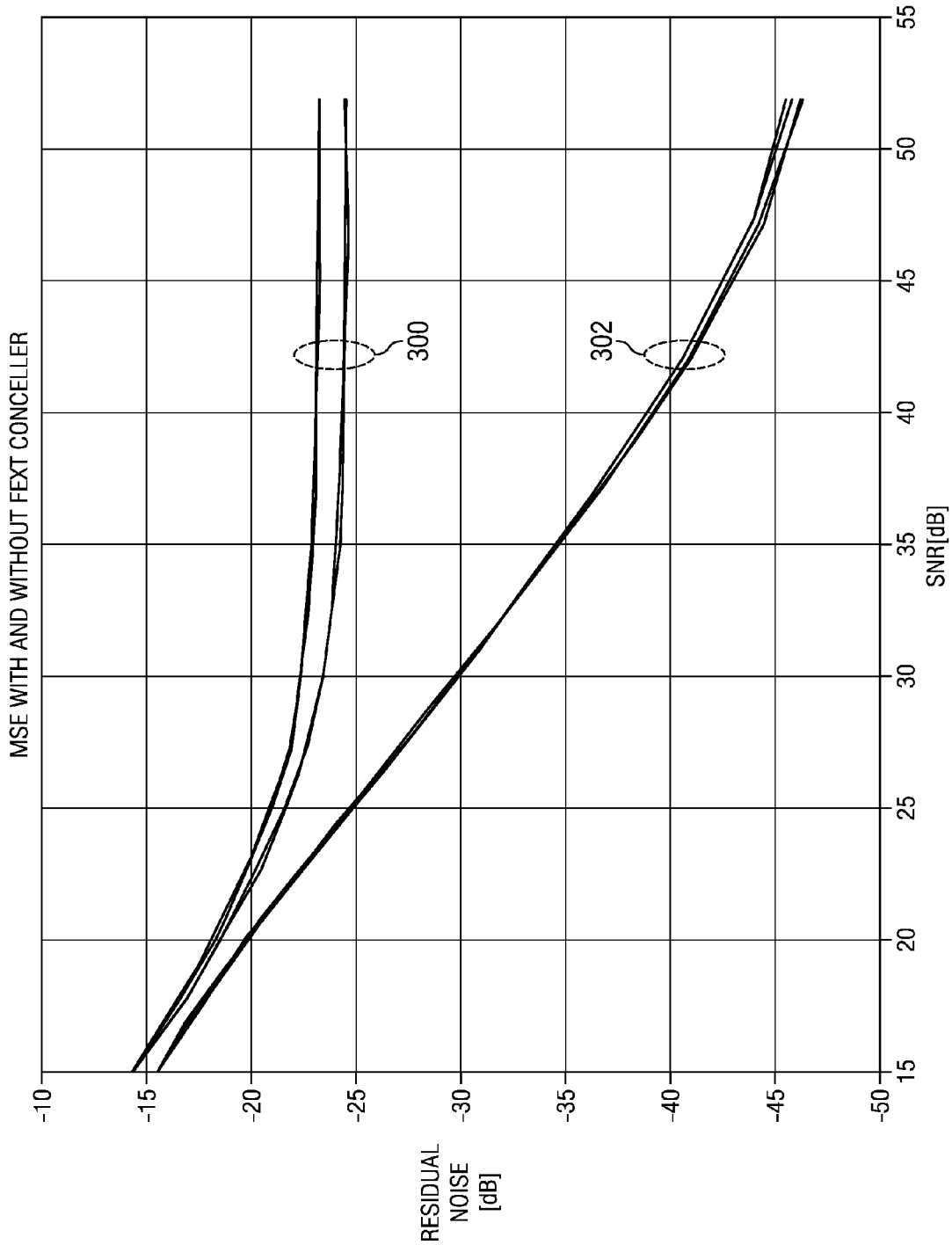
FIG. 15 is a graph illustrating the residual noise with and without the FEXT canceller of the present invention.

A graph illustrating the residual noise with and without the FEXT canceller of the present invention is shown in FIG. 15. The x-axis represents the SNR between the desired signal and all alien noise sources. The y-axis represents the total residual noise at the output of the receiver after all impairment cancellations have been performed. The curves 300 represent the SNR obtained without FEXT cancellation of the present invention. Curves 302 represent the SNR obtained with the benefit of FEXT cancellation of the present invention. Depending on the level of available SNR, the improvement obtained with the FEXT canceller of the present invention is significant. For example, at 40 dB between the desired signal and alien noise sources, the invention provides an improvement of approximately 15 dB reduction in residual noise at the output of the receiver.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of cancellation of far-end crosstalk (FEXT) from one or more adjacent wire pairs, said method comprising the steps of:

performing feed forward equalization (FFE) on a signal received over a wire pair so as to generate a desired equalization signal therefrom;

performing linear FEXT equalization on signals received from said adjacent wire pairs taken before feed forward equalization (FFE) in their respective receiver circuits so as to generate FEXT error signals therefrom, wherein said step of performing linear FEXT equalization comprises the step of filtering corresponding receive signals using an N×N matrix W(D) comprising filter coefficients representing the frequency transformation between said FEXT error signals and the signals received from each adjacent wire pair, wherein N is a positive integer greater than zero; and subtracting said FEXT error signals from said desired equalization signal to generate a FEXT compensated signal therefrom.

2. The method according to claim 1, wherein the number of adjacent wire pairs equals three.

3. A method of cancellation of far-end crosstalk (FEXT) from one or more adjacent wire pairs, said method comprising the steps of:

performing feed forward equalization (FFE) on a signal received over a wire pair so as to generate a desired equalization signal therefrom;

performing linear FEXT equalization on signals received from said adjacent wire pairs taken before feed forward equalization (FFE) in their respective receiver circuits so as to generate FEXT error signals therefrom, wherein said step of performing linear FEXT equalization comprises an inherent delay matching that of said desired equalization signal; and subtracting said FEXT error signals from said desired equalization signal to generate a FEXT compensated signal therefrom.

4. A method of cancellation of far-end crosstalk (FEXT) from one or more adjacent wire pairs, said method comprising the steps of:

performing feed forward equalization (FFE) on a signal received over a wire pair so as to generate a desired equalization signal therefrom;

delaying said desired equalization signal to generate a delayed desired equalization signal;

performing linear FEXT equalization on signals received from said adjacent wire pairs taken after feed forward equalization (FFE) in their respective receiver circuits so as to generate FEXT error signals therefrom; and subtracting said FEXT error signals from said delayed desired equalization signal to generate a FEXT compensated signal therefrom.

5. The method according to claim 4, wherein said step of performing linear FEXT equalization comprise the step of filtering corresponding receive signals using an N×N matrix W(D) comprising filter coefficients representing the frequency transformation between said FEXT error signals and the signals received from each adjacent wire pair, wherein N is a positive integer greater than zero.

6. The method according to claim 4, wherein said step of performing linear FEXT equalization comprises an inherent delay matching that of said delayed desired equalization signal.

7. The method according to claim 4, wherein the number of adjacent wire pairs equals three.

8. The method according to claim 4, wherein the signals received from said adjacent wire pairs are taken after near-end crosstalk (NEXT) and echo compensation.

9. The method according to claim 4, wherein said delayed desired equalization signal incorporates near-end crosstalk (NEXT) and echo compensation.

10. An apparatus for cancellation of far-end crosstalk (FEXT) from one or more adjacent wire pairs, comprising:

a feed forward equalizer operative to perform feed forward equalization (FFE) on a signal received over a wire pair so as to generate a desired equalization signal therefrom;

a delay circuit operative to delay said desired equalization signal to generate a delayed desired equalization signal;

a slicer adapted to generate decisions from signals received from said adjacent wire pairs taken after feed forward equalization (FFE);

an auxiliary decision feedback equalizer (DFE) operative to generate a DFE error signal from said decisions output of said slicer, wherein said DFE error signal is subtracted from the input to said slicer;

a linear FEXT equalizer for performing linear FEXT equalization on said slicer output so as to generate FEXT error signals therefrom; and means for subtracting said FEXT error signals from said delayed desired equalization signal to generate a FEXT compensated signal therefrom.

11. The apparatus according to claim 10, wherein said linear FEXT equalizer comprises means for filtering corresponding receive signals using an N×N matrix W(D) comprising filter coefficients representing the frequency transformation between said FEXT error signals and the signals received from each adjacent wire pair, wherein N is a positive integer greater than zero.

12. The apparatus according to claim 10, wherein said linear FEXT equalizer comprises an inherent delay matching that of said delayed desired equalization signal.

13. The apparatus according to claim 10, wherein the number of adjacent wire pairs equals three.

14. A method of cancellation of far-end crosstalk (FEXT) from one or more adjacent wire pairs, said method comprising the steps of:

performing feed forward equalization (FFE) on a signal received over a wire pair so as to generate a desired equalization signal therefrom;

first performing FEXT equalization on signals received from said adjacent wire pairs taken before feed forward equalization (FFE) in their respective receiver circuits so as to generate first FEXT error signals therefrom; and second performing FEXT equalization on adjacent wire pair zero delay decoder output decisions so as to generate second FEXT error signals therefrom; and subtracting said first FEXT error signals and said second FEXT error signals from said delayed desired equalization signal to generate a FEXT compensated signal therefrom.

15. The method according to claim 14, wherein said decoder comprises a Viterbi decoder.

16. The method according to claim 14, wherein said step of first performing FEXT equalization comprises the step of performing feedfoward based FEXT equalization.

17. The method according to claim 14, wherein said step of first performing FEXT equalization comprises the step of performing decision feedback based FEXT equalization.

18. A communications transceiver, comprising:

a transmitter coupled to said communications channel;

a receiver coupled to said communications channel;

a far-end crosstalk (FEXT) canceller, comprising:

means for performing feed forward equalization (FFE) on a signal received over a wire pair so as to generate a desired equalization signal therefrom;

means for performing feedfoward based FEXT equalization on signals received from one or more adjacent wire pairs taken before feed forward equalization (FFE) in their respective receiver circuits so as to generate first FEXT error signals therefrom; and means for performing decision feedback based FEXT equalization on adjacent wire pair zero delay Viterbi output decisions so as to generate second FEXT error signals therefrom; and means for subtracting said first FEXT error signals and said second FEXT error signals from said delayed desired equalization signal to generate a FEXT compensated signal therefrom.

19. The transceiver according to claim 18, wherein said communications transceiver comprises a Gigabit Ethernet transceiver.

20. The transceiver according to claim 18, wherein the number of adjacent wire pairs equals three.

* * * * *